United States Patent
Park et al.

(10) Patent No.: US 9,414,412 B2
(45) Date of Patent: *Aug. 9, 2016

(54) RANDOM ACCESS SCHEME FOR USER EQUIPMENT

(71) Applicant: LG ELECTRONICS INC., Seoul (KR)

(72) Inventors: Sung Jun Park, Anyang-si (KR); Seung June Yi, Anyang-si (KR); Sung Duck Chun, Anyang-si (KR); Young Dae Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,093

(22) Filed: May 11, 2015

(65) Prior Publication Data

US 2015/0245387 A1    Aug. 27, 2015

Related U.S. Application Data

(63) Continuation of application No. 13/923,304, filed on Jun. 20, 2013, now Pat. No. 9,049,728, which is a continuation of application No. 12/913,670, filed on Oct. 27, 2010, now Pat. No. 8,493,994, which is a (Continued)

(30) Foreign Application Priority Data

Nov. 5, 2009    (KR) .................. 10-2009-0106392

(51) Int. Cl.
*H04W 4/00* (2009.01)
*H04W 74/08* (2009.01)
(Continued)

(52) U.S. Cl.
CPC .......... *H04W 74/0833* (2013.01); *H04W 48/08* (2013.01); *H04W 74/006* (2013.01); *H04W 74/008* (2013.01); *H04W 28/04* (2013.01)

(58) Field of Classification Search
None
See application file for complete search history.

(56) References Cited

U.S. PATENT DOCUMENTS 6,594,240 B1    7/2003    Chuah et al.
6,785,548 B2    8/2004    Moulsley et al.
(Continued)

FOREIGN PATENT DOCUMENTS

CN    1315099 A    9/2001
CN    101188852 A    5/2008
(Continued)

OTHER PUBLICATIONS

LG Electronics Inc. et al., "Correction to PHR Functionality," 3GPP TSG-RAN2 Meeting #64bis, R2-090706, Ljubljana, Slovenia, Jan. 12-16, 2009, pp. 1-3.

(Continued)

*Primary Examiner* — Anh-Vu Ly
(74) *Attorney, Agent, or Firm* — Birch, Stewart, Kolasch & Birch, LLP

(57) ABSTRACT

A method and terminal for use in a communication system are discussed. The terminal can transmit a random access preamble via a physical random access channel (PRACH) to a network. The terminal may monitor a random access response after transmitting the random access preamble during a specific time window. Furthermore, if no random access response containing a random access preamble identifier corresponding to the transmitted random access preamble is received within the specific time window and a specific random access response contains a backoff indicator subheader is received, a preamble transmission counter is incremented by 1. A subsequent random access preamble transmission is delayed by a backoff time selected using a backoff indicator in the backoff indicator subheader, if the random access preamble was selected by a medium access control (MAC) layer.

6 Claims, 12 Drawing Sheets

Related U.S. Application Data continuation of application No. 12/650,813, filed on Dec. 31, 2009, now Pat. No. 7,848,346.

(60) Provisional application No. 61/159,803, filed on Mar. 13, 2009, provisional application No. 61/142,613, filed on Jan. 5, 2009, provisional application No. 61/142,257, filed on Jan. 2, 2009.

(51) Int. Cl.
*H04W 48/08* (2009.01)
*H04W 74/00* (2009.01)
*H04W 28/04* (2009.01)

(56) References Cited

U.S. PATENT DOCUMENTS

| | | | |
|---|---|---|---|
| 6,836,469 B1 | 12/2004 | Wu | |
| 7,075,971 B2 | 7/2006 | Parsa et al. | |
| 7,848,346 B2 | 12/2010 | Park et al. | |
| 7,957,298 B2 | 6/2011 | Yi et al. | |
| 7,979,769 B2 * | 7/2011 | Chun | H04L 1/1822 370/474 |
| 7,986,946 B2 | 7/2011 | Pettersson | |
| 8,027,356 B2 * | 9/2011 | Lee | H04W 74/002 370/445 |
| 8,274,969 B2 | 9/2012 | Wu | |
| 8,331,230 B2 | 12/2012 | Pedersen et al. | |
| 8,428,014 B2 | 4/2013 | Cave et al. | |
| 8,493,994 B2 * | 7/2013 | Park | H04W 48/08 370/448 |
| 8,681,608 B2 | 3/2014 | Lee et al. | |
| 8,908,570 B2 | 12/2014 | Yu et al. | |
| 9,049,728 B2 * | 6/2015 | Park | H04W 48/08 370/448 |
| 2001/0043582 A1 | 11/2001 | Nakada | |
| 2002/0009067 A1 | 1/2002 | Sachs et al. | |
| 2002/0154653 A1 | 10/2002 | Benveniste | |
| 2002/0167920 A1 | 11/2002 | Miyazaki et al. | |
| 2003/0095534 A1 | 5/2003 | Jiang | |
| 2004/0052230 A1 | 3/2004 | Soliman | |
| 2004/0147276 A1 | 7/2004 | Gholmieh et al. | |
| 2005/0014508 A1 | 1/2005 | Moulsley et al. | |
| 2005/0078641 A1 | 4/2005 | Kim | |
| 2005/0117675 A1 | 6/2005 | Das et al. | |
| 2005/0120097 A1 | 6/2005 | Walton et al. | |
| 2005/0141436 A1 | 6/2005 | Dick et al. | |
| 2005/0249123 A1 | 11/2005 | Finn | |
| 2006/0013182 A1 | 1/2006 | Balasubramanian et al. | |
| 2006/0280145 A1 | 12/2006 | Revel et al. | |
| 2007/0076679 A1 | 4/2007 | Lee | |
| 2007/0140178 A1 | 6/2007 | Jung et al. | |
| 2007/0171933 A1 | 7/2007 | Sammour et al. | |
| 2008/0008212 A1 | 1/2008 | Wang et al. | |
| 2008/0043771 A1 | 2/2008 | Cho et al. | |
| 2008/0052388 A1 | 2/2008 | Korkishko et al. | |
| 2008/0096563 A1 | 4/2008 | Fischer et al. | |
| 2008/0098234 A1 | 4/2008 | Driscoll et al. | |
| 2008/0186892 A1 | 8/2008 | Damnjanovic | |
| 2008/0188247 A1 | 8/2008 | Worrall | |
| 2008/0194259 A1 * | 8/2008 | Vujcic | H04W 74/0866 455/435.1 |
| 2008/0207150 A1 | 8/2008 | Malladi et al. | |
| 2008/0232317 A1 | 9/2008 | Jen | |
| 2008/0232329 A1 | 9/2008 | Jen | |
| 2008/0233941 A1 | 9/2008 | Jen | |
| 2008/0294958 A1 | 11/2008 | Lee et al. | |
| 2008/0310396 A1 | 12/2008 | Park et al. | |
| 2009/0041240 A1 | 2/2009 | Parkvall et al. | |
| 2009/0041246 A1 | 2/2009 | Kitazoe | |
| 2009/0046641 A1 | 2/2009 | Wang et al. | |
| 2009/0086671 A1 | 4/2009 | Pelletier et al. | |
| 2009/0088195 A1 | 4/2009 | Rosa et al. | |
| 2009/0156194 A1 | 6/2009 | Meylan | |
| 2009/0163211 A1 | 6/2009 | Kitazoe et al. | |
| 2009/0175187 A1 | 7/2009 | Jersenius et al. | |
| 2009/0186624 A1 | 7/2009 | Cave et al. | |
| 2009/0196208 A1 | 8/2009 | Yu et al. | |
| 2009/0201873 A1 * | 8/2009 | Korhonen | H04W 74/008 370/329 |
| 2009/0209248 A1 * | 8/2009 | Lee | H04W 74/002 455/422.1 |
| 2009/0232058 A1 | 9/2009 | Lee et al. | |
| 2009/0232076 A1 | 9/2009 | Kuo | |
| 2009/0238141 A1 | 9/2009 | Damnjanovic et al. | |
| 2009/0239545 A1 | 9/2009 | Lee et al. | |
| 2009/0259910 A1 | 10/2009 | Lee et al. | |
| 2009/0300457 A1 | 12/2009 | Kuo | |
| 2009/0303954 A1 | 12/2009 | Guo | |
| 2009/0316586 A1 | 12/2009 | Yi et al. | |
| 2009/0316593 A1 | 12/2009 | Wang et al. | |
| 2010/0034162 A1 | 2/2010 | Ou et al. | |
| 2010/0080181 A1 | 4/2010 | Yamada et al. | |
| 2010/0093386 A1 | 4/2010 | Damnjanovic et al. | |
| 2010/0111067 A1 | 5/2010 | Wu | |
| 2010/0172299 A1 | 7/2010 | Fischer et al. | |
| 2010/0202288 A1 | 8/2010 | Park et al. | |
| 2010/0226325 A1 | 9/2010 | Chun et al. | |
| 2010/0260136 A1 | 10/2010 | Fan et al. | |
| 2011/0002262 A1 | 1/2011 | Wang et al. | |
| 2011/0103499 A1 | 5/2011 | Cheng et al. | |
| 2011/0116364 A1 | 5/2011 | Zhang et al. | |
| 2011/0216705 A1 | 9/2011 | Lee et al. | |
| 2011/0216706 A1 | 9/2011 | Lee et al. | |
| 2013/0265866 A1 * | 10/2013 | Yi | H04W 74/0841 370/216 |
| 2014/0092851 A1 | 4/2014 | Wang et al. | |

FOREIGN PATENT DOCUMENTS

| | | |
|---|---|---|
| EP | 1 755 355 A1 | 2/2007 |
| EP | 1 973 281 A2 | 9/2008 |
| EP | 2 094 053 A1 | 8/2009 |
| JP | 2000-341204 A | 12/2000 |
| JP | 2007-266733 A | 10/2007 |
| JP | 2008-541545 A | 11/2008 |
| JP | 2009/525655 A | 7/2009 |
| JP | 2009-303213 A | 12/2009 |
| JP | 2010-518724 A | 5/2010 |
| JP | 2011-508538 A | 3/2011 |
| JP | 2011-509049 A | 3/2011 |
| KR | 10-0567211 B1 | 4/2006 |
| KR | 10-2006-0115175 A | 11/2006 |
| KR | 10-2007-0108300 A | 9/2007 |
| KR | 10-2007-0107619 A | 11/2007 |
| KR | 10-2007-0109313 A | 11/2007 |
| KR | 10-2008-0016367 A | 2/2008 |
| KR | 10-2008-0026583 A | 3/2008 |
| KR | 10-0816598 B1 | 3/2008 |
| KR | 10-2008-0039177 A | 5/2008 |
| KR | 10-2008-0039294 A | 5/2008 |
| KR | 10-2008-0049596 A | 6/2008 |
| KR | 10-2008-0065880 A | 7/2008 |
| KR | 10-2008-0112649 A | 12/2008 |
| KR | 10-2009-0014937 A | 2/2009 |
| KR | 10-2009-0015402 A | 2/2009 |
| KR | 10-2009-0084690 A | 8/2009 |
| KR | 10-0938102 B1 | 1/2010 |
| RU | 2233546 C2 | 7/2004 |
| RU | 2332802 C2 | 1/2008 |
| WO | WO 2004/056009 A1 | 7/2004 |
| WO | WO 2006/118427 A2 | 11/2006 |
| WO | WO 2007/082407 A1 | 7/2007 |
| WO | WO 2007/083230 A2 | 7/2007 |
| WO | WO 2007/091831 A2 | 8/2007 |
| WO | WO 2007/126301 A1 | 11/2007 |
| WO | WO 2007/128204 A1 | 11/2007 |
| WO | WO 2007/143916 A1 | 12/2007 |
| WO | WO 2008/024628 A2 | 3/2008 |
| WO | WO 2008/042967 A2 | 4/2008 |
| WO | WO 2008/054112 A2 | 5/2008 |
| WO | WO 2008/097023 A1 | 8/2008 |
| WO | WO 2008/097030 A1 | 8/2008 |
| WO | WO 2008/100009 A1 | 8/2008 |

(56) References Cited

FOREIGN PATENT DOCUMENTS

| WO | WO 2008/131401 A1 | 10/2008 |
|---|---|---|
| WO | WO 2008/155469 A1 | 12/2008 |
| WO | WO 2009/005429 A1 | 1/2009 |
| WO | WO 2009/023470 A2 | 2/2009 |
| WO | WO 2009/086188 A2 | 7/2009 |
| WO | WO 2009/088858 A1 | 7/2009 |
| WO | WO 2009/096195 A1 | 8/2009 |

OTHER PUBLICATIONS

"3rd Generation Partnership Project; Technical Specification Group Radio Access Network; Evolved Universal Terrestrial Radio Access (E-UTRA) and Evolved Packet Core (EPC), User Equipment (UE) . . . (Release 8)," 3GPP TS 36.523-1 V8.0.0, Dec. 2008, pp. 1-497.

"3rd Generation Partnership Project; Technical Specification Group Radio Access Network; Evolved Universal Terrestrial Radio Access (E-UTRA) Medium Access Control (MAC) Protocol Specification (Release)"; 3 GPP TS 36.321 V8.2.0; May 2008; 33 pages.

"BSR priority" 3GPP Draft, R2-081589 BSR Priority, 3GPP, Mobile Competence Centre; 650, Route Des Lucioles; F-06921 Sophia-Antipolis Cedex; France, RAN WG2, No. Shenzhen, China; Mar. 24, 2008, XP050139321.

"Evolved Universal Terrestrial Radio Access (E-UTRA) and Evolved Universal Terrestrial Radio Access (E-UTRAN); Overall description: Stage 2 (3GPP TS 36.300 version 8.4.0 Release 8), ETSI TS 136 300" ETSI Standards, LIS, Sophia antipolis cedex. France, vol. 3-R2, No. V8.4.0, (Apr. 1, 2008), XP014041816.

"Triggers for Power Headroom Reports in EUTRAN Uplink"; 3GPP TSG RAN WG1 Meeting #52bis R1-081464; Nokia Siemens Networks, Nokia; Agenda item 6.3.2; Shenzhen, China, Mar. 31-Apr. 4, 2008; 2 pages.

3GPP Draft: R2-0802509 Restriction to PDCCH for Contention Resolution RO, 3GPP, Mobile Competence Centre; 650, Route des Lucioses; F-06921 Sophia-Antipolis cedex; France, vol. RAN WG2, No. Kansas City, USA; Apr. 29, 2008, pp. 1-2, XP050140190.

3GPP Draft; R2-074787_DL_GRANT_MSG2_RO, 3GPP, Mobile Competence Centre; 650, Route des Lucioses; F-06921 Sophia-Antipolis cedex; France, vol. RAN WG2, No. Jeju:20071105, Oct. 30, 2007, pp. 1-3, XP050137299.

3GPP Draft; R2-0810189 LTE_RA_BO_RO, 3GPP, Mobile Competence Centre; 650, Route Des Lucioles; F-06921 Sophia-Antipolis Cedex; France, vol. RAN WG2, No. Sevilla, Spain; Jan. 7, 2008, XP050138064.

3GPP Draft; R2-081035 LTE RACH_M2_V1, 3RD Generation Partnership Project (3GPP), Mobile Competence Centre; 650, Route Des Lucioles; F=06921 Sophia-Antipolis Cedex; France, vol. RAN WG2, No. Sorrento, Italy; Feb. 5, 2008, XP050138825.

3GPP TS 36.321 V8.2.0(May 2008); Technical Specification Group Radio Access Network; Evolved Universal Terrestrial Radio Access (E-UTRA) Medium Access Control (MAC) protocol specification (Release 8), p. 1-33.

3GPP, "3rd Generation Partnership Project; Technical Specification Group Radio Access Network; Evolved Universal Terrestrial Radio Access (E-UTRA) Medium Access Control (MAC) protocol specification (Release 8)," 3GPP TS 36.321, V8.3.0, Sep. 2008, pp. 1-36.

3GPP, "Evolved Universal Terrestrial Radio (E-UTRA)", TS 36.321 V8.1.0 (Mar. 2008).

3GPP, "Medium Access Control (MAC) Protocol Specification (Release 8)", TS 36.321 V8.1.0 (Mar. 2008).

Alcatel-Lucent: "TP on Power Headroom reporting" 3GPP Draft; R2-082224_PH Text Proposal, 3GPP Mobile Competence Centre; 650, Route Des Lucioles; F-06921 SOPHI-Antipolis Cedex, France, vol. RAN WG2, No. Kansas City, USA; Apr. 28, 2008,XP050139993.

Dahlman et al., "3G Evolution HSPA and LTE for Mobile Broadband", LTE access procedures, Academic Press (Elsevier), Second Edition, 2008, p. 441.

Ericsson et al., "Prioritization of MAC Control Elements," Change Request, 36.321 CR 0167, 3GPP TSG-RAN WG2, Meeting #64, R2-087413, Prague, Czech Republic, Nov. 10-14, 2008, 3 pages.

Ericsson: "UE transmission power headroom report for LTE" 3GPP TSG RAN WG2 #62, R2-082147, May 5, 2008, pp. 1-4, XP002539839 (Aug. 4, 2009).

Ghosh et al., "Random Access Design for UMTS Air-Interface Evolution," IEEE 65th Vehicular Technology Conference, Apr. 22, 2007, pp. 1041-1045.

Handover Failure Handling, 3GPP Draft; R2-081054, —3rd Generation Partnership Project (3GPP), Mobile Competence Centre; 65, route des Lucioles: F-06921 Sophia-Antipolis Cedex; France, 2008.

Huawei, "Corrections to Random Access Procedure," 3GPP TSG-RAN WG2 Meeting #64, R2-087042, Nov. 10-14, 2008. Prague, Czech Republic, 8 pages.

Huawei, "Discussion of Message 3," 3GPP TSG RAN2 #60bis, Agenda Item 4.3.1, R2-080239, Sevilla Spain, Jan. 14-18, 2008, 3 pages.

Infineon: "TP for the UL Logical channel prioritization" 3GPP Mobile Competence Centre; 650, Route Des Lucioles; F-06921 Sophia-Antipolis Cedex; France, vol. RAN WG2, No. Kansas City, WAS; Apr. 29, 2008, XP050140185, R2-082504.

LG Electronics Inc et al., "Reflection of RAN1 LS on timing adjust and addition of MAC padding in random access response," 3GPP TSG-RAN2 Meeting #64 R2-086374, Prague, Czech Republic, Nov. 10-14, 2008, 9 pages.

LG Electronics Inc. et al., "Counter proposal to R2-090969 on Management for HARQ buffer with TAT", 3GPP TSG-RAN2 Meeting #65, R2-091232, Feb. 9-13, 2009, p. 1-3.

LG Electronics Inc., "Correction to MAC PDU Format for Random Access Response," 3GPP TSG-RAN2 Meeting #62bis, Jun. 30-Jul. 4, 2008, 6 pages total, R2-083370.

LG Electronics Inc., "Correction to RACH Procedure", 3GPP TSG-RAN2 Meeting #64, Prague, Czech Republic, Nov. 10-14, 2008, R2-087070, pp. 1-6.

LG Electronics Inc., "Management for HARQ buffer with TAT", 3GPP TSG-RAN2 Meeting #65, R2-090969, Feb. 9-13, 2009, p. 1-2.

LG Electronics Inc: "Correction to DRX" 3GPP Draft; R2-083274 Proposed CR to 36.321 [REL-8] Correction to DRX, 3GPP, Mobile Competence Centre; 650, Route des Lucioles; F-06921 Sophia-Antipolis cedex; France, vol. RAN WG2, No. Warsaw, Poland, Jun. 23, 2008, XP050140694.

LG Electronics Inc: "Correction to Multiplexing Procedure for BSR" 3GPP Draft; R2-083275, 3GPP, vol. RAN WG2, No. Warsaw, Poland; Jun. 23, 2008, XP050140695.

LG Electronics Inc: "Correction to RACH Procedure" 3GPP Draft, R2-086137 [REL-8] Proposed CR to 36.321 Correction to RACH Procedure, 3RD Generation Partnership Project (3GPP) Mobile Competence Centre; 650, Route des Lucioses; F-06921 Sophia-Antipolis cedex; France, No. Prague, Czech Republic; Nov. 10, 2008, pp. 1-6, XP050321188.

LG Electronics Inc: "Missing condition for unsuccessful reception of Msg2" 3GPP Draft; R2-090323 Proposed CR to 36.321 on Missing Condition for Unsuccessful. Reception of MSG2, 3GPP, Mobile Competencecentre; 650, Route Des Lucioles; F-06921 Sophia-Antipolis Cedex, France, No. Ljubljana; 20090106, XP050322312.

LG Electronics: "Corrections to the Random Access Response reception" 3GPP Draft; R2-082447 LTE-RACH_RESP_RO, 3GPP, Mobile Competence Centre; 650, Route Des Lucioles; F-06921 Sophia-Antipolis Cedex; France, vol. RAN WG2, No. Kansas City, USA: Apr. 28, 2008, XP050140134.

MAC Rapporteurs (Qualcomm Europe et al: "E-UTRA MAN protocol specification update" 3GPP Draft; R2-081719 E-UTRA MAC Protocol Specification Update (CR), 3RD Generation Partnership Project (3GPP), Mobile Competence Centre; 650, Route des Lucioses; F-06921 Sophia-Antipolis cedex; France. vol. RAN WG2, No. Shenzhen, China; Mar. 25, 2008, XP050139431.

MAC Rapporteurs (Qualcomm Europe et al:"36.321 CR covering agreements of RAN2 #61bis and RAN2#62"); R2-082902, 2008, XP050140449.

(56) References Cited

OTHER PUBLICATIONS

MAC Rapporteurs (Quamcomm Europe et al: "E-UTRA MAC protocol specification update" 3GPP Draft; R2-081389 CR0001 to 36321-800 3GPP, Mobile Competence Centre; 650, Route des Lucioses; F-06921 Sophia-Antipolis cedex; France, vol. RAN WG2, Sorento, Italy, Feb. 23, 2008, XP050139110, 2008.

Nokia Corporation et al., "Message 3 Definition", 3GPP TSG-RAN2 Meeting #64, R2-086077, Oct. 10-14, 2008; p. 1-3.

Nokia Siemens Networks et al: "Triggers for Power Headroom Reports in EUTRAN Uplink" 3GPP Draft; R1-080947, 3GPP, Mobile Competence Centre; 650, Route Des Lucioles; F-06921 Sophia-Antipolis Cedex; France, vol. RAN WG1, No. Sorrento, Italy; Feb. 5, 2008, XP050109419.

Nokia Siemens Networks: "Power Headroom Reporting" Internet Citation, May 5, 2008, pp. 1-4, XP002537452, R2-082197.

Nokia: "Scheduling Information for E-UTRAN Uplink" 20071008-20071012, vol. TSG-RAN WG2 Meeting #59BIS, No. R2-073909, pp. 1-3, XP002522064.

NTT Docomo et al: "RA response format" 3GPP Draft; R2-080451, 3GPP, Mobile Competence Centre; 650, Route Des Lucioles; F-06921 Sophia-Antipolis Cedex; France, vol. RAN WG2, No. Sevilla, Spain; Jan. 8, 2008, XP050138299.

Panasonic, "Priority handling of MAC Control Elements", 3GPP TSG RAN WG2#62, Kansas City, USA, R2-082227, May 5-9, 2008, pp. 1-2.

Panasonic: "Clarification on A Active Time A definition" 3GPP Draft; R2-082225, 3GPP, Mobile Competence Centre; 650, Route des Lucioles; F-06921 Sophia-antipolis cedex, France, vol. RAN WG2, No. Kansas City, USA; Apr. 29, 2008, XP050139994.

Panasonic: "Priority handling of MAC Control Elements" Internet Citation, May 5, 2008, XP002537451.

Sunplus Mmobile Inc: "Align the DRX Active Time with RA procedure" 3GPP Draft; R2-083428, 3GPP, Mobile Competence Centre; 650, Route des Lucioses; F-06921 Sophia-Antipolis cedex; France, vol. RAN WG2, No. Warsaw, Poland, Jun. 23, 2008, XP050140819.

XP 050139679, 3GPP Draft; R2-082049 See whole document esp. section 5.1 and subsections thereof and subsections 5.4.3.1 and 5.4.3.2, 2008.

XP 050323507, 3GPP Draft; R2-091633cr273r1-R2-090988, See whole document esp. subsections 5.4.3.1 and 5.4.3.2, 2009.

\* cited by examiner

RANDOM ACCESS SCHEME FOR USER EQUIPMENT

CROSS REFERENCE TO RELATED APPLICATIONS

This application is a Continuation of U.S. patent application Ser. No. 13/923,304 filed on Jun. 20, 2013, which is a continuation of U.S. patent application Ser. No. 12/913,670, filed Oct. 27, 2010 (now U.S. Pat. No. 8,493,994, issued on Jul. 23, 2013), which is a Continuation of U.S. patent application Ser. No. 12/650,813, filed Dec. 31, 2009 (now U.S. Pat. No. 7,848,346, issued on Dec. 7, 2010), which claims priority to Korean Patent Application No. 10-2009-0106392, filed on Nov. 5, 2009, and U.S. Provisional Application Nos. 61/142,257, 61/142,613 and 61/159,803, filed Jan. 2, 2009, Jan. 5, 2009 and Mar. 13, 2009. The entire contents of all of the above applications are hereby incorporated by reference.

BACKGROUND OF THE INVENTION

1. Field of the Invention

The present invention relates to a mobile telecommunications technology, and more particularly, to a random access scheme for a user equipment. Although the present invention is suitable for a wide scope of applications, it is particularly suitable for efficiently processing a random access response message when performing random access in a mobile telecommunications terminal.

2. Discussion of the Related Art

As an example of a mobile telecommunications system to which the present invention may be applied, a $3^{rd}$ generation partnership project long term evolution (hereinafter referred to as "LTE") (3GPP LTE) telecommunications system will now be broadly described.

FIG. 1 illustrates a general view of an E-UMTS network structure as an example of a mobile telecommunications system. Herein, the evolved universal mobile telecommunications system (E-UMTS) corresponds to a system evolved from the conventional universal mobile telecommunications system (UMTS). The 3GPP is presently carrying out a basic standardization process for the E-UMTS. Generally, the E-UMTS may also be referred to as an LTE system.

The E-UMTS network may be broadly divided into an evolved-UMTS terrestrial radio access network (E-UTRAN) 101 and a core network (CN) 102. The E-UTRAN 101 consists of a user equipment (hereinafter referred to as a "UE") 103, a base station (hereinafter referred to as an "eNode B" or an "eNB") 104, and an access gateway (hereinafter referred to as an "AG") 105, which is located at an end of the network. The AG 105 may be divided into a portion for processing user traffic and a portion for processing control traffic. At this point, a new interface may be used between a new AG for processing the user traffic and an AG for processing control traffic, thereby enabling the AGs to communicate to and from one another.

At least one or more cells may exist in a single eNode B. An interface for user traffic or control traffic may be used between each eNode B. CN 102 may be configured of a node used for user registration of AG 105 and other UEs 103. Additionally, an interface for differentiating E-UTRAN 101 from CN 102 may also be used.

Layers of a radio interface protocol between a user equipment (or terminal) and a network may be divided into an L1 (i.e., a first layer), an L2 (i.e., a second layer), and an L3 (i.e., a third layer), based upon 3 lower layers of an open system interconnection (OSI) reference model, which is generally and broadly known in a telecommunications system. Herein, a physical layer belonging to the first layer provides an information transfer service using a physical channel. Also, a radio resource control (hereinafter referred to as "RRC") layer located in the third layer performs a function of controlling radio source between the terminal and the network. For this, the RRC layer enables the user equipment and the network to exchange RRC messages to and from one another. The RRC layer may be dispersed in network nodes, such as the eNode B 104 and the AG 105, or the RRS layer may be located only in either one of the eNode B 104 and the AG 105.

FIG. 2 and FIG. 3 respectively illustrate a structure of a radio interface protocol between a user equipment (or terminal), which is configured based upon a 3GPP radio access network standard, and a UTRAN. The radio interface protocol of FIG. 2 and FIG. 3 is horizontally configured of a physical layer, a data link layer, and a network layer, and the radio interface protocol of FIG. 2 and FIG. 3 is vertically divided into a user plane and a control plane. Herein, the user place is used for transmitting data information, and the control plane is used for delivering control signals (or for control signaling). More specifically, FIG. 2 illustrates each layer of the radio protocol control plane, and FIG. 3 illustrates each layer of the radio protocol user plane. As described above, the protocol layers of FIG. 2 and FIG. 3 may be divided into an L1 (i.e., a first layer), an L2 (i.e., a second layer), and an L3 (i.e., a third layer), based upon 3 lower layers of an open system interconnection (OSI) reference model, which is generally and broadly known in a telecommunications system.

Hereinafter, each layer of the radio protocol control plane shown in FIG. 2 and the radio protocol user plane shown in FIG. 3 will now be described in detail.

A physical (PHY) layer, which corresponds to the first layer, uses a physical channel to provide an information transfer service to its higher layer (or upper layer). The PHY layer is connected to a medium access control (MAC) layer, which corresponds to the higher layer of the PHY layer, through a transport channel. And, data are transported (or transmitted) to and from the MAC layer and the PHY layer through the transport channel. At this point, depending upon the sharing of the channel, the transport channel may be broadly divided into a dedicated transport channel and a common transport channel. Furthermore, data are transported (or transmitted) to and from different PHY layers, i.e., to and from the PHY layer of a transmitting system and the PHY layer of a receiving system, through a physical channel by using a radio source.

Multiple layers exist in the second layer. A medium access control (MAC) layer maps various logical channels to various transport channels. And, the MAC layer also performs logical channel multiplexing, wherein multiple logical channel are mapped to a single transport channel. The MAC layer is connected to its higher layer (or upper layer), a radio link control (RLC) layer, through a logical channel. And, depending upon the type of information that are being transported, the logical channel may be broadly divided into a control channel, which transports information of a control plane, and a traffic channel, which transports information of a user plane.

The radio link control (RLC) layer of the second layer performs segmentation and concatenation on the data received from its higher layer, thereby adjusting the size of the data so that its lower layer can adequately transport the processed data to a radio section. Also, in order to ensure diverse quality of service (QOS) requested by each radio bearer (RB), the RLC layer provides three different operation modes, a transparent mode (TM), an un-acknowledged mode (UM), and an acknowledged mode (AM). Particularly, the AM RLC performs a re-transport function through an automatic repeat and request (ARQ) function in order to transport (or transmit) reliable data.

A packet data convergence protocol (PDCP) layer of the second layer performs a header compression function that reduces the size of an IP packet header, which has a relatively large data size and carries (or contains) unnecessary control information, in order to efficiently transport IP packets in a radio section having a small bandwidth, when transporting IP packets, such as IPv4 or IPv6. By allowing only the information absolutely necessary in the header portion of the corresponding data to be transported, the header compression function enhances the transport efficiency of the radio section. Furthermore, in the LTE system, the PDCP layer also performs a security function. Herein, the security function consists of ciphering and integrity protection. More specifically, ciphering prevents data monitoring (or data surveillance) by a third party, and integrity protection prevents data altering by a third party.

A radio resource control (RRC) layer of the third layer, which corresponds to the uppermost layer in the third layer, is defined only in the control plane. Being associated to the configuration, re-configuration, and release of radio bearers (RBs), the RRC layer controls logical channels, transport channels, and physical channels. Herein, the RB signifies a logical path provided by the first and second layers of a radio protocol, in order to deliver data between the user equipment and the UTRAN. Generally, the configuration of an RS refers to a process of regulating the characteristics of a radio protocol layer and channel, which are required for providing a specific service, and of respectively configuring each specific parameter and operating method. The RB is then divided into signaling RB (SRB) and data RB (DRB). Herein, the SRB is used as a path for transporting an RRC message from the control plane (C-plane), and the DRB is used as a path for transporting user data from the user plane (U-plane).

Downlink transport channels transporting (or transmitting) data from the network to the user equipment include a broadcast channel (BCH) and a downlink shared channel (SCH). More specifically, the BCH transports system information, and the downlink SCH transports other user traffic or control messages. A downlink multicast or a traffic or control message may either be transported through the downlink SCI or may be transported through a separate downlink multicast channel (MCH). Meanwhile, uplink transport channels transporting data from the user equipment to the network include a random access channel (RACH) and an uplink shared channel (SCH). More specifically, the RACH transports initial control messages, and the uplink SCH transports other user traffic or control messages.

Additionally, downlink physical channels transporting information, which are transported to the downlink transport channel, to the radio section between the network and the user equipment include a physical broadcast channel (PBCH), a physical multicast channel (PMCH), a physical downlink shared channel (PDSCH), and a physical downlink control channel (PDCCH) (or a downlink (DL) L1/L2 control channel). More specifically, the PBCH transports information of the BCH, and the PMCH transports information of the MCH. The PDSCH transports information of the PCH and the downlink SCH. And, the PDCCH transports control information provided from the first layer and the second layer, such as a downlink or uplink (DL/UL) scheduling grant. Meanwhile, uplink physical channels transporting information, which are transported to the uplink transport channel, to the radio section between the network and the user equipment include a physical uplink shared channel (PUSCH), a physical random access channel (PRACH), and a physical uplink control channel (PUCCH). More specifically, the PUSCH transports information of the uplink SCH, and the PRACH transports information of the RACH. Furthermore, the PUCCH transports control information provided from the first layer and the second layer, such as an HARQ ACK or NACK, a scheduling request (SR), and a channel quality indicator (CQI) report.

Hereinafter, based upon the above description, the method for performing a random access from the user equipment to a base station (or an eNode B or eNB) will be described in detail. Firstly, the user equipment performs a random access process (or procedure) under the following circumstances:

when the user equipment performs an initial access, due to an absence of an RRC connection between the user equipment and the eNode B when the user equipment performs a first access to a target cell, during a handover process when a random access process is requested by a command from the eNode B when data that are to be transported through an uplink are generated, in case time synchronization of the uplink does not match, or in case a designated radio source is not allocated, the designated radio source being used for requesting a radio source when performing a recovery process, in case of a radio link failure or a handover failure In the LTE system, during the procedure of selecting a random access preamble, a contention based random access procedure, wherein the user equipment randomly selects and uses a preamble from a specific group, and a non-contention based random access procedure, which uses a random access preamble allocated from the base station (or eNode B) only to a specific user equipment, are both provided. However, the non-contention based random access procedure may be used only during the handover procedure (or process) or only upon request from the base station (or eNode B).

Meanwhile, the process of the user equipment performing a random access with a specific base station (or eNode B) may broadly include the steps of (1) having the user equipment transport an random access preamble to the eNode B (or base station) (also referred as a "message 1" transporting step, in case there is no confusion hereinafter), (2) receiving a random access response from the eNode B with respect to the transported random access preamble (also referred as a "message 2" receiving step, in case there is no confusion hereinafter), (3) transporting an uplink message from the random access response message by using the received information (also referred as a "message 3" transporting step, in case there is no confusion hereinafter), and (4) receiving a message corresponding to the uplink message from the eNode B (also referred as a "message 4" receiving step, in case there is no confusion hereinafter).

In the above-described random access procedure, the user equipment stores data that are to be transported through message 3 in a message 3 buffer (or Msg3 buffer). Then, the user equipment transports (or transmits) the data stored in the message 3 buffer with respect to the reception of an uplink grant (or UL grant) signal. The UL grant signal corresponds to a signal notifying information on an uplink radio source, which may be used when the user equipment transports a signal to the base station (or eNode B). Herein, in case of the above-described LTE system, the UL grant signal is received through a random access response (RAR) message, which is received through the physical downlink control channel (PDCCH) or the physical uplink shared channel (PUSCH). Hereinafter, the method for receiving a random access response message of the user equipment will be described in more detail.

FIG. 4 illustrates a method for receiving and processing a random access response message according to a current LTE standard. After transporting the random access preamble, the user equipment attempts to receive its own random access response from within a random access response reception window, which is designated by the base station (or eNode B) through a system information or handover command. More specifically, the random access response information may be transported in a MAC packet data unit (MAC PDU) format. And, the MAC PDU for transporting random access response information includes a MAC payload and a MAC subheader respective of the MAC payload. Herein, the MAC payload corresponds to random access response message information for at least one or more user equipments. The MAC PDU may further include a MAC subheader including a backoff indicator, which may be used when the user equipment reattempts random access. The MAC PDU may be transported through the physical downlink shared channel (PDSCH). Accordingly, in step 601, it is determined whether or not a received random access response message exists within the predetermined random access response reception window. If it is determined that a received random access response message does not exist within the predetermined random access response reception window, it is concluded (or determined) that the reception of the random access response message has failed. Subsequently, the procedure moves on to step 604, so that the operations according to the failure of receiving the random access response message can be performed.

Alternatively, if it is determined that a received random access response message exists within the predetermined random access response reception window, the system determines, in step 602, whether each of the random access response messages received within the random access response reception window includes a random access identifier (e.g., RA-RNTI), which does not correspond to (or match) the random access preamble already transported from the user equipment. If it is determined that all of the random access response messages received within the random access response reception window include a random access identifier, which does not correspond to (or match) the random access preamble already transported from the user equipment, the user equipment concludes that the reception of the respective random access response message has failed. Thereafter, the procedure moves on to step 604, so that the operations according to the failure of receiving the random access response message can be performed. On the other hand, if it is determined that at least one or more random access response messages received within the random access response reception window include a random access identifier, which corresponds to the random access preamble already transported from the user equipment, the procedure moves on to step 603, so that the corresponding random access response message can be processed.

SUMMARY OF THE INVENTION

Accordingly, the present invention is directed to a random access scheme for a user equipment that substantially obviates one or more problems due to limitations and disadvantages of the related art.

A random access response message reception algorithm of the above-described user equipment has been designed under the assumption that the MAC PDU for transporting random access response information essentially consists of a MAC payload, which functions as a random access response message for at least one or more user equipments, and a MAC subheader respective to the MAC payload. More specifically, in the current LTE standard, it is assumed that the MAC PDU includes a MAC subheader including a backoff indicator, which can be used when the user equipment reattempts random access, as an optional element, and that the MAC PDU includes the MAC payload, functioning as a random access response message for at least one or more user equipments, and the MAC subheader respective to the MAC payload, as its essential elements.

In a system, wherein a load increases within a cell that provides a service, or in a system which uses a low bandwidth, the following description of the present invention proposes a base station that allows, when required, the transport (or transmission) of a MAC PDU including only the backoff indicator. An object of the present invention is to provide a random access scheme for a user equipment that can provide a random access response message reception algorithm for a user equipment improved according to the proposed system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method of performing a random access to a base station by a terminal, the method includes the steps of transmitting a random access preamble to the base station, receiving, from the base station in response to the random access preamble, a random access response message having a format of medium access control protocol data unit (MAC PDU) including only a backoff indicator subheader in a header portion of the MAC PDU, and considering a random access response reception procedure not successful, and performing a subsequent procedure for a random access responses reception failure.

At this point, the terminal may be adapted to consider the random access response reception procedure not successful, if no random access response is received within a random access response window having a predetermined time length, or if none of all received random access responses contains a random access preamble identifier corresponding to the transmitted random access preamble.

More specifically, a case in which none of all received random access responses contains the random access preamble identifier corresponding to the transmitted random access preamble may include a first case in which all received random access responses contain random access preamble identifiers that do not match the transmitted random access preamble, and a second case in which the random access response message having the format of MAC PDU including only the backoff indicator subheader in the header portion of the MAC PDU is received.

In the embodiment of the present invention, the subsequent procedure for the random access response reception failure may be performed by incrementing a random access preamble transmission counter by 1, and indicating to an higher layer higher than a medium access control (MAC) layer that there is a random access problem, if the random access preamble transmission counter becomes a predetermined maximum number of preamble transmission.

Additionally, the subsequent procedure for the random access response reception failure may also be performed by incrementing a random access preamble transmission counter by 1, and delaying a subsequent random access preamble transmission by a backoff time selected using a backoff indicator in the backoff indicator subheader, if the random access preamble is selected by a medium access control (MAC) layer.

Herein, it may be assumed that the random access response message having the format of MAC PDU is received through a physical downlink shared channel (PDSCH).

In another aspect of the present invention, in a terminal performing a random access to a base station, the terminal includes a transmitting (Tx) module transmitting a random access preamble to the base station, a receiving (Rx) module receiving, from the base station in response to the random access preamble, a random access response message having a format of medium access control protocol data unit (MAC PDU), and, a medium access control (MAC) layer module adapted to consider a random access response reception procedure not successful and to perform a subsequent procedure for a random access response reception failure, when the random access response message received by the receiving module corresponds to a MAC PDU including only a backoff indicator subheader in a header portion of the MAC PDU.

At this point, the MAC layer module may be adapted to consider the random access response reception procedure not successful, if the receiving module does not receive any random access response within a random access response window having a predetermined time length, or if none of all received random access responses containing a random access preamble identifier corresponding to the random access preamble transmitted from the transmitting module is received by the receiving module.

Additionally, a case in which none of all received random access responses containing the random access preamble identifier corresponding to the random access preamble transmitted from the transmitting module is received by the receiving module, may include a first case in which all random access responses received by the receiving module contain random access preamble identifiers that do not match the random access preamble transmitted from the transmitting module, and a second case in which the random access response message having the format of MAC PDU including only the backoff indicator subheader in the header portion of the MAC PDU is received by the receiving module.

In the embodiment of the present invention, as the subsequent procedure for the random access response reception failure, the MAC layer module may increment a random access preamble transmission counter by 1, and may indicate to a higher layer module corresponding to a higher layer higher than a medium access control (MAC) layer that there is a random access problem, if the random access preamble transmission counter becomes a predetermined maximum number of preamble transmission. And, the MAC layer module may also delay a subsequent random access preamble transmission by a backoff time selected using a backoff indicator in the backoff indicator subheader, if the random access preamble is selected by a medium access control (MAC) layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It should be understood that the present invention is not limited solely to the following embodiment. The following description includes specific details for providing a full understanding of the present invention. However, it is apparent to anyone skilled in the art that the present invention may also be embodied without such specific details. For example, although it is assumed in the following detailed description of the present invention that the mobile telecommunications system according to the present invention corresponds to a 3GPP LTE system, the present invention may also be applied to other random mobile telecommunications systems, excluding the typical characteristics of the 3GPP LTE system.

In some cases, to avoid any ambiguity in the concept of the present invention, structures or devices of the disclosure may be omitted, or the embodiment of the present invention may be illustrated in the form of block views focusing on the essential functions of each structure and device. Also, wherever possible, the same reference numbers will be used throughout the drawings to refer to the same or like parts.

Furthermore, in the following description of the present invention, it is assumed that a terminal collectively refers to a mobile or fixed-type user-end device, such as a user equipment (UE), a mobile station (MS), and so on. Additionally, it is also assumed that a base station collectively refers to a random node of a network-end communicating with the terminal, such as Node B, an eNode B, a base station, and so on.

As described above, the following description of the present invention proposes a base station that allows, when required, the transport (or transmission) of a MAC PDU including only the backoff indicator. Hereinafter, in order to understand the necessity of the above-described MAC PDU including only the backoff indicator, the random access procedure and the format of message 2 will be described in detail.

Figure 5:
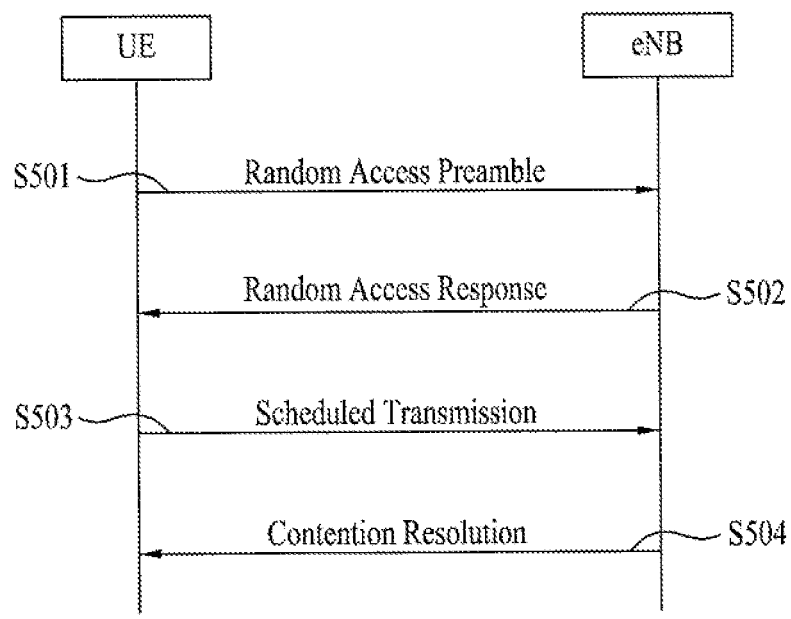
FIG. 5 illustrates operation process of the user equipment (or terminal) and the base station in a contention based random access procedure.

FIG. 5 illustrates operation process of the user equipment (or terminal) and the base station in a contention based random access procedure.

(1) Transmitting Message 1

The user equipment randomly selects a random access preamble from a group of random access preambles designated by a system information or handover command and, then, the user equipment may select and transport a physical RACH (PRACH) source that can transport the selected random access preamble (S501).

(2) Receiving Message 2

After the user equipment transmits a random access preamble, as shown in S501, the base station attempts to receive its random access response from within a random access response reception window designated by a system information or handover command (S502). More specifically, random access response information may be transmitted in a MAC PDU format, and the MAC PDU may be delivered (or transported) through a physical downlink shared channel (PDSCH). Also, in order to allow the user equipment to adequately receive the information being delivered to the PDSCH, it is preferable that the user equipment monitors a physical downlink control channel (PDCCH). In other words, it is preferable that the PDCCH includes information on the user equipment that should receive the PDSCH, frequency and time information of a radio source of the PDSCH, and a transmission (or transport) format of the PDSCH. Once the user equipment succeeds in receiving the PDCCH that is transported (or transmitted) thereto, the user equipment may adequately receive random access responses transmitted to the PDSCH depending upon the information of the PDCCH. Furthermore, the random access responds may include a random access preamble identifier (RAPID), an uplink (UL) grant notifying the uplink radio source, a temporary cell identifier (C-RNTI), and a timing advance command (TAC).

As described above, a random access preamble identifier (RAPID) is required in the random access response because random access response information for at least one or more user equipments may be included in a single random access response, and also because information specifying (or indicating) the user equipment, in which the UL grant, the temporary C-RTNI, and the TAC are valid, is required. In this step, it is assumed that the user equipment selects a random access preamble identifier (RAPID) matching the random access preamble selected by the user equipment itself in step 502. Through the selected RAPID, the user equipment may receive the UL grant, the temporary cell identifier (C-RNTI), and the timing advance command (TAC).

(3) Transmitting Message 3

When the user equipment receives a valid random access response, each set of information included in the random access response is processed. More specifically, the user equipment adopts the TAC and stores the temporary cell identifier (C-RNTI). Also, data that are to be transmitted with respect to the reception of the valid random access response may be stored in the message 3 buffer (or Msg3 buffer).

Meanwhile, the user equipment uses the received U: grant, so as to transmit the data (i.e., message 3) to the base station (S503). Message 3 shall include an identifier of the user equipment. In the contention based random access procedure, the base station is incapable of knowing which user equipments perform the random access process. Accordingly, the user equipments should be identified in order to resolve collision is a later process.

Two methods for including identifiers for each user equipment are proposed herein. In the first method, if the user equipment is already provided with a valid cell identifier, which had been allocated from the corresponding cell prior to the random access process, the user equipment transmits its cell identifier through a UL transport (or transmission) signal corresponding to the UL grant. Conversely, if the user equipment has not been assigned with a valid cell identifier prior to the random access process, the user equipment transmits data including its unique identifier (e.g., S-TMSI or random ID). Generally, the unique identifier is longer than the cell identifier. If the user equipment has transmitted the data corresponding to the UL grant, a contention resolution timer (hereinafter referred to as a "CR timer") for resolving contention (or collision) is disclosed.

(4) Receiving Message 4

After the user equipment has transmitted the data containing its identifier through the UL grant included in the random access response, the user equipment waits for instructions from the base station for resolving collision (or contention). More specifically, in order to a specific message, the user equipment attempts the reception of the PDCCH (S504). Two methods for receiving the PDCCH have been proposed. As described above, if the identifier of message 3, which is transmitted with respect to the UL grant, is transmitted by using a cell identifier, the user equipment uses its own cell identifier to attempt PDCCH reception. On the other hand, if the identifier corresponds to a unique identifier, the user equipment may attempt PDCCH reception by using a temporary cell identifier included in the random access response. Thereafter, in the former case, if the user equipment receives the PDCCH through its own cell identifier prior to the expiration of the CR timer, the user equipment determines that the random access process has been successfully performed, thereby ending the random access process. In the latter case, if the user equipment receives the PDCCH through a temporary cell identifier prior to the expiration of the CR timer, the user equipment verifies the data transmitted through the PDSCH, which is designated by the PDCCH. Then, if the data content contains the unique identifier, the user equipment determines that the random access process has been successfully performed, thereby ending the random access process.

Hereinafter, data configuration format of the random access response provided from the base station to the user equipment, in the above-described contention based random access procedure, will be described in detail.

FIG. 6 to FIG. 9 illustrate a MAC PDU format for random access response message transmission and structures of MAC subheaders and a random access response configuring the MAC PDU.

Figure 6:
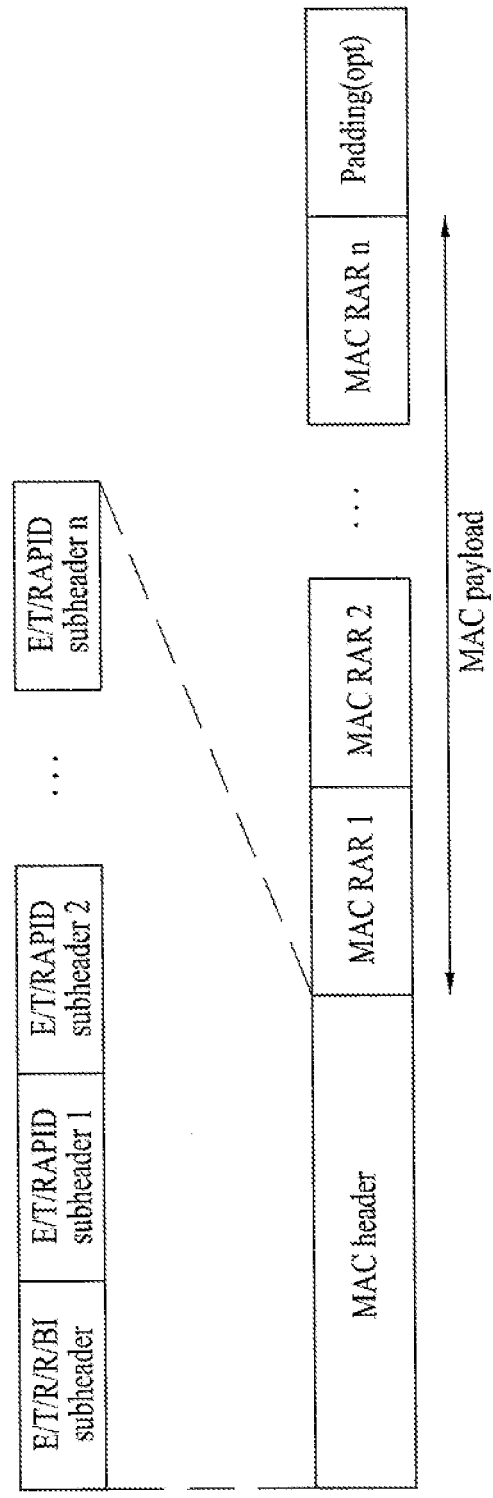
FIG. 6 to FIG. 9 illustrate a MAC PDU format for random access response message transmission and structures of MAC subheaders and a random access response configuring the MAC PDU.
Figure 7:
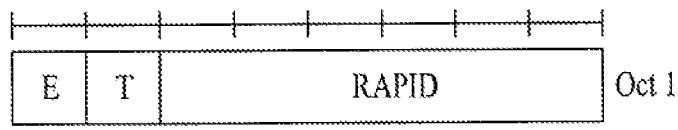

As shown in FIG. 6, the MAC PDU for transmitting the random access response message may include a MAC header and a MAC payload and may also include a padding unit as an optional element. The MAC payload may include N number of random access response information (hereinafter referred to as "MAC RAR"), wherein N is an integer. The MAC header may include MAC subheaders respective to each of the N number of MAC RARs. Herein, the MAC subheaders corresponding to each MAC RAR may be respectively configured of E/T/RAPID fields, as shown in FIG. 7. Furthermore, the MAC header may further include a MAC subheader containing a backoff indicator for notifying the backoff indicator used for determining a time delay when the user equipment reattempts random access. Herein, the MAC subheader containing the backoff indicator (i.e., backoff subheader) may be configured of E/T/R/R/BI fields, as shown in FIG. 8.

Figure 8:
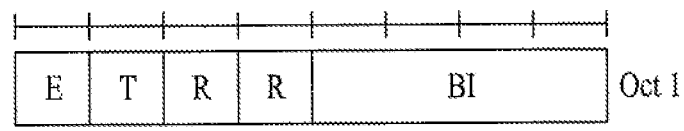

The E field (or extension field) of the MAC subheader corresponding to each MAC RAR and of the MAC subheader containing the backoff indicator, as shown in FIG. 7 and FIG. 8, indicates whether or not MAC subheaders respective to additional MAC RARs exist. For example, when the E field is set to '1', this indicates that MAC subheaders of the E/T/RAPID format exist after the corresponding MAC header. When the E field is set to '0', the user equipment determines that there exist no more MAC subheaders subsequent to the corresponding MAC subheader. And, occasionally, the user equipment may determine that a MAC payload begins at the ending point of the corresponding MAC subheader, thereby being capable of performing a MAC payload reading process.

Meanwhile, the T field (or type field) shown in FIG. 7 and FIG. 8, may indicate whether the corresponding MAC subheader corresponds to MAC subheader respective to the MAC RAR, or whether the corresponding MAC subheader corresponds to the MAC subheader containing the backoff indicator. If the T field is set to '1', this indicates that a random access preamble identifier exists in the corresponding MAC subheader. And, if the T field is set to '0', this indicates that the corresponding MAC subheader corresponds to the MAC subheader containing the backoff indicator.

The RAPID field of the MAC subheader respective to the MAC RAR, shown in FIG. 7, indicates a random access preamble identifier indicating which random access preamble the respective MAC RAR corresponds to. Also, the BI field of the MAC subheader containing the backoff indicator, shown in FIG. 8, indicates the backoff indicator. In FIG. 8, the RS field corresponds to a reserved field.

Figure 9:
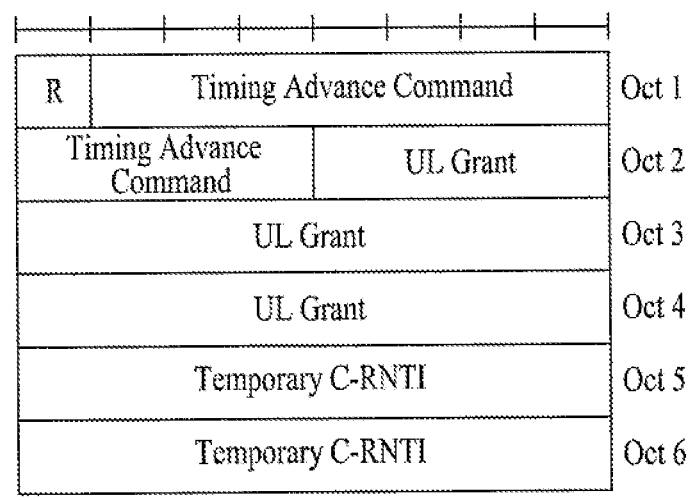

Meanwhile, FIG. 9 illustrates a structure of the MAC RAR. As shown in FIG. 9, the MAC RAR consists of 4 fields: an R field indicating a reserved bit, a "timing advance command" field for determining (or setting up) uplink signal synchronization, a UL grant field, and a temporary cell identifier (or temporary C-RNTI) field.

As shown in FIG. 6 to FIG. 9, and more particularly, as shown in FIG. 6, in the current LTE standard, it is defined that the MAC PDU for transmitting a random access response message consists of MAC RARs and MAC subheader respective to each MAC RAR, as essential elements, and also of a MAC subheader containing a backoff indicator, as an optional element. However, in case the random access response containing only the backoff indicator cannot be supported, the following problems may occur.

It is assumed that, in a system of a low bandwidth (e.g., 1.25 MHz or 5 MHz), a plurality of user equipments each transmitting a random access preamble for random access at a specific moment (or time point) to the base station exists. At this point, due to reasons such as lack of sources that are to be assigned (or allocated), the base station may not be able to provide UL grant via random access response to all of the user equipments transmitting a random access preamble. In this case, apart from the user equipments being provided with the UL grant, it is preferable for the base station to use a backoff indicator on the remaining user equipments that are not provided with the UL grant, so as to delay transmission by a random time value (or a random period of time), thereby instructing retransmission of the random access preamble. This is because, if the retransmission for random access is not adequately dispersed in a random access overload situation, the retransmission of the random access preamble and a new access may be accumulated and generated. Thus, the above-described overload situation may be aggravated.

However, in addition to the above-described scenario, when random access of multiple user equipments occurs, and when the base station is incapable of providing a UL grant to any one of the multiple user equipments, in a system regulating the MAC RAR and the respective MAC subheader as the essential elements configuring the MAC PDU, which is used to transmit random access response messages, backoff indicators cannot be transmitted to the user equipments. Accordingly, in a random access overload situation, backoff indicators cannot be transmitted to the respective user equipments, not to mention that all retransmission of random accesses for the corresponding user equipments will be eventually concentrated in the next (or subsequent) opportunity for random access preamble transmission. Furthermore, new access will also be attempted during the same opportunity for random access preamble transmission. Thus, the above-described overload situation may be even more aggravated.

Figure 10:
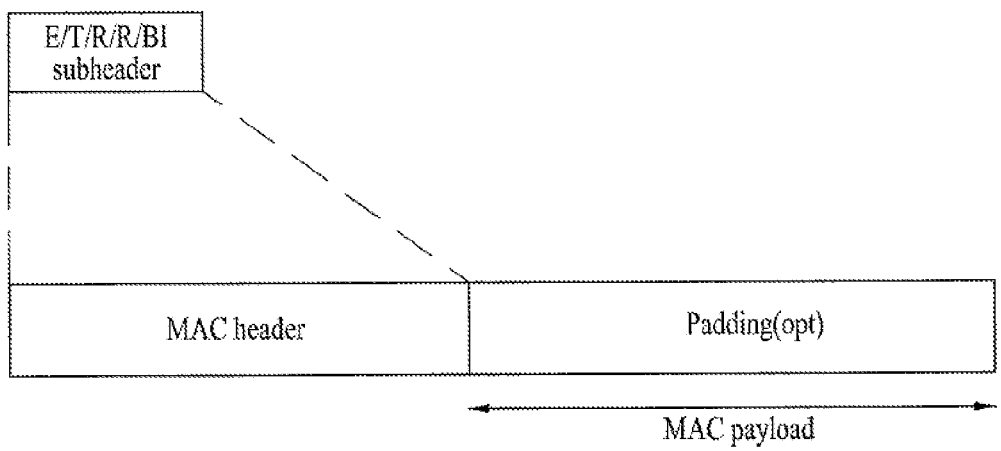
FIG. 10 illustrates a MAC PDU format including only a backoff indicator according to an embodiment of the present invention.

Therefore, an embodiment of the present invention proposes a MAC PDU format, which includes a MAC header containing only MAC subheaders including backoff indicators that can be used according to the embodiment of the present invention. FIG. 10 illustrates a MAC PDU format including only a backoff indicator according to an embodiment of the present invention.

When comparing the MAC PDU format shown in FIG. 10 with the MAC PDU shown in FIG. 6, FIG. 10 illustrates a MAC PDU format including only backoff indicator MAC subheaders in the MAC header portion, wherein each MAC subheader consists of E/T/R/R/BI fields. As described above, by supporting the MAC PDU including only the backoff indicator MAC subheaders, in case the base station is incapable of performing source assignment (or allocation) to any user equipment via RAR, the base station may deliver (or transport) backoff indicators to each user equipment, thereby adequately distributing retransmission timing of the random access preamble.

Evidently, in this embodiment of the present invention, the MAC RAR and the respective MAC subheader may be included in the MAC header portion, as shown in FIG. 6. More specifically, it is proposed that the MAC PDU for transmitting random access response message according to the embodiment of the present invention includes one MAC header and zero, one, or multiple MAC RARs. The MAC PDU that does not include any MAC RAR indicates that the corresponding MAC PDU does not include any MAC subheader respective to the absent MAC RAR. Nevertheless, the MAC PDU according to the embodiment of the present invention may further and optionally include a padding unit.

By using the MAC PDU shown in FIG. 10, even when the base station is incapable of transmitting UL grants to the respective user equipments through the MAC RAR, the base station may transmit a backoff indicator so as to delay random access of the corresponding user equipment(s) by a specific period of time. Furthermore, when receiving a MAC subheader having an E field of '0' and a T field of '0', the user equipment does not attempt the reception of the MAC RAR. Instead, the user equipment may interpret the BI field of the corresponding MAC subheader, so as to apply the interpreted content to the retransmission of a subsequent random access preamble.

Meanwhile, in case a MAC PDU including only a backoff indicator MAC subheader is being supported according to an embodiment of the present invention, it will be examined through the following description whether or not one or more problems exist in the random access response reception procedure described with reference to FIG. 4.

Figure 4:
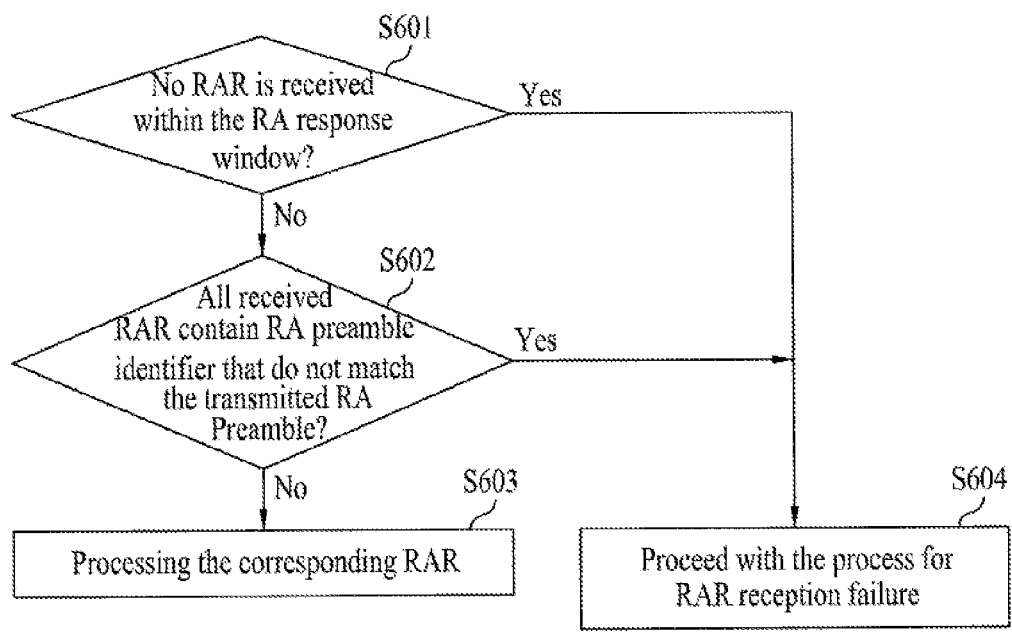
FIG. 4 illustrates a method for receiving and processing a random access response message according to a current LTE standard.

In case the user equipment receives a MAC PDU including only a backoff indicator MAC subheader from the base station, since a received random access response message exists within the random access response reception window in step 601 of FIG. 4, the user equipment moves on to step 602. Then, in step 602 of FIG. 4, not all of the RARs received by the user equipment include a random access preamble identifier, which are non-respective to (or do not match) the random access preambles transmitted by each RAR itself. Therefore, the user equipment moves on to step 603. More specifically, in case the user equipment receives only the backoff indicator MAC subheader from the base station, since no random access preamble indicator is included, the user equipment does not determine that the reception of the random access response has failed.

However, in case the user equipment receives only the backoff indicator MAC subheader from the base station, since the MAC PDU does not include any MAC RAR transmitted from the corresponding user equipment, it is impossible to process the respective MAC RAR.

Therefore, in a preferred embodiment of the present invention, the support of a MAC PDU format random access response message, wherein the MAC PDU format includes only the backoff indicator MAC subheader, as shown in FIG. 10, is additionally considered. Thus, in case the user equipment receives the MAC PDU format random access response message, wherein the MAC PDU format includes only the backoff indicator MAC subheader, from the base station, the user equipment determines that the reception of the corresponding random access response message has failed. Thereafter, as proposed in the preferred embodiment of the present invention, the user equipment is set (or adapted) to perform operations according to the failure to receive the random access response message.

More specifically, when the user terminal receives a random access response message including only the backoff indicator MAC subheader from the base station according to the embodiment of the present invention, it is proposed in the description of the present invention that the user equipment is set (or adapted) to perform the following operations according to the failure to receive the random access response message.

1. Increment a PREAMBLE_TRANSMISSION_COUNTER value by 1.
2. If the condition of PREAMBLE_TRANSMISSION_COUNTER=PREAMBLE_TRANS_MAX+1 is satisfied, the problem of random access is indicated (or reported) to the higher (or upper) layer.
3. If the random access procedure currently under process corresponds to the contention based random access procedure, i.e., if a random access preamble is selected by a medium access control (MAC) layer, select a backoff time according to a uniform distribution, so as to delay transmission by the selected backoff time, thereby performing the random access source selection process (i.e., the random access preamble retransmission process).

Hereinafter, improvements of the algorithm for receiving and processing a random access response message of a MAC layer module included in the user equipment according to the embodiments of the present invention will be described in detail.

Improvement 1

Figure 11:
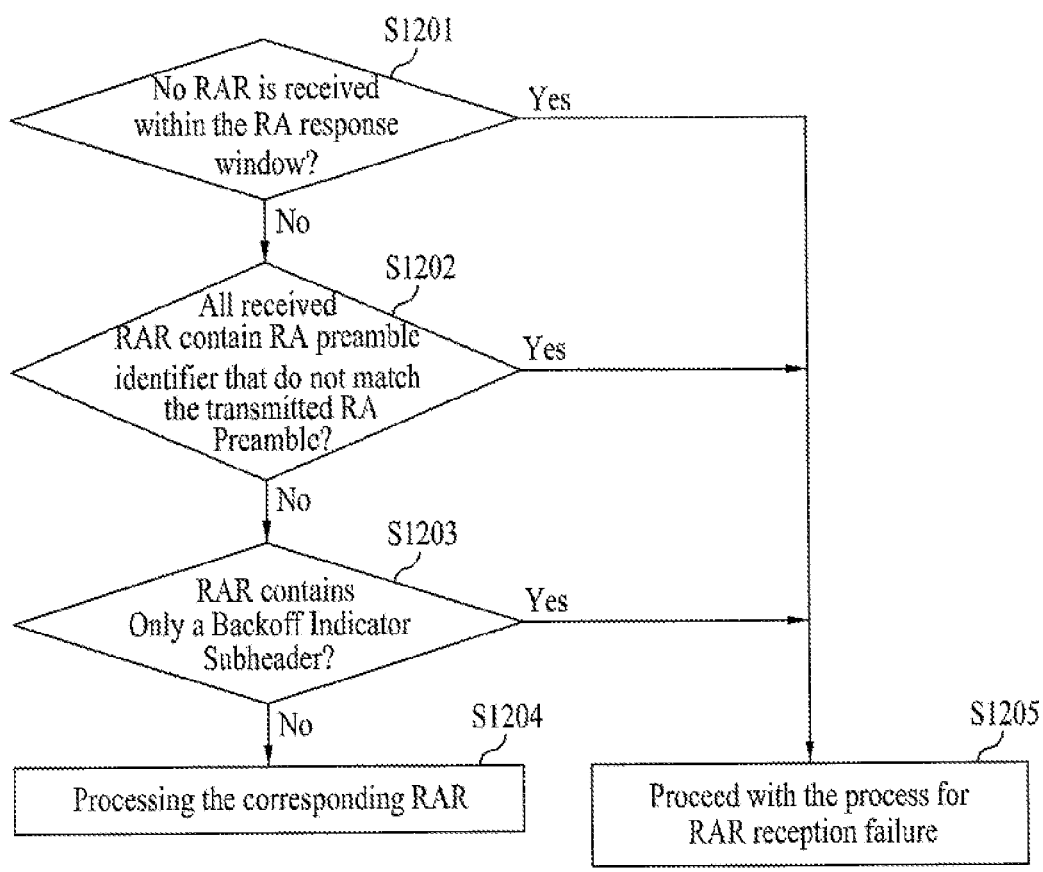
FIG. 11 illustrates an algorithm for receiving and processing a random access response message of a user equipment improved according to an embodiment of the present invention.

FIG. 11 illustrates an algorithm for receiving and processing a random access response message of a user equipment improved according to an embodiment of the present invention.

In comparison with FIG. 4, step 1203 and a procedure for processing a subsequent random access response message depending upon the result determined in step 1203 are additionally included in the algorithm for receiving and processing a random access response message of FIG. 11. More specifically, when the user equipment receives a random access response message including only the backoff indicator MAC subheader from the base station, since the conditions of step 1201 and step 1202 are not satisfied, as described above, the procedure moves on to step 1203. In step 1203, when the user equipment receives a random access response message including only the backoff indicator MAC subheader, it is determined that the reception of the random access response message has failed. And, accordingly, in step 1203, the random access transmission counter is incremented by '1', thereby reporting the random access problem to the higher layer according to the random access transmission counter value, or attempting retransmission of the random access preamble by applying the received backoff indicator.

Improvement 2

Figure 12:
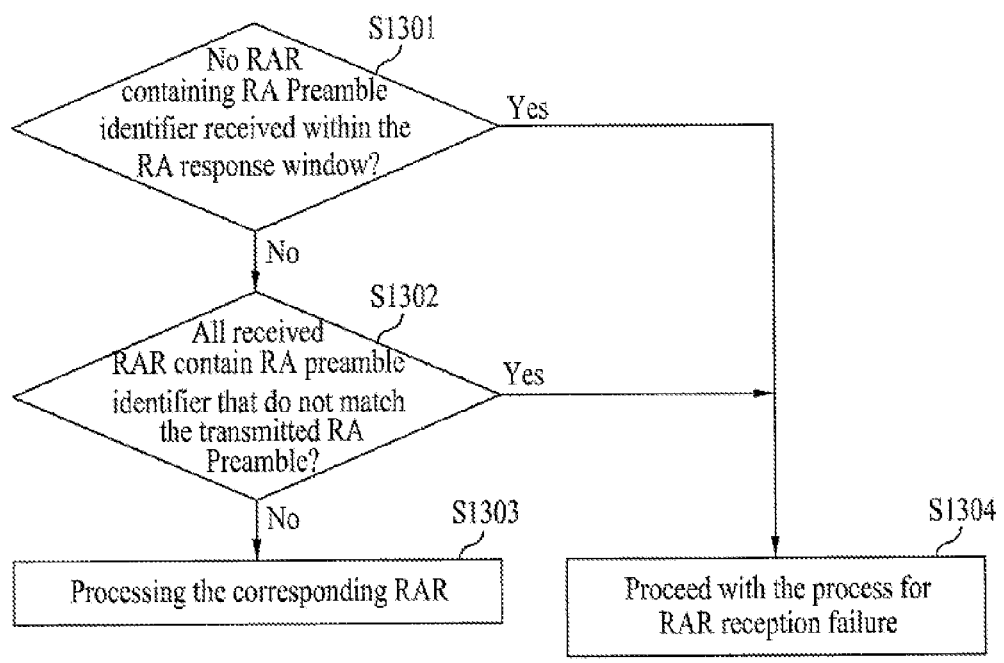
FIG. 12 illustrates an algorithm for receiving and processing a random access response message of a user equipment improved according to another embodiment of the present invention.

FIG. 12 illustrates an algorithm for receiving and processing a random access response message of a user equipment improved according to another embodiment of the present invention.

In comparison with FIG. 4, the conditions of step 1301 are improved in the algorithm for receiving and processing a random access response message of FIG. 12. More specifically, in step 1301, the user equipment determines whether a random access response including a random access preamble identifier is received in a predetermined random access response reception window. If the user equipment receives a random access response including only a backoff indicator MAC subheader from the base station, this indicates that the random access response including a random access preamble identifier has not been received in the predetermined random access response reception window. Thus, the procedure moves on to step 1304, so as to perform operations according to the failure to receive the random access response. And, accordingly, in step 1304, the user equipment increments the random access transmission counter by '1', thereby reporting the random access problem to the higher layer according to the random access transmission counter value, or attempting retransmission of the random access preamble by applying the received backoff indicator.

The remaining parts and respective operations of the algorithm for receiving and processing a random access response message of FIG. 12 are identical to those described in FIG. 4.

Improvement 3

Figure 13:
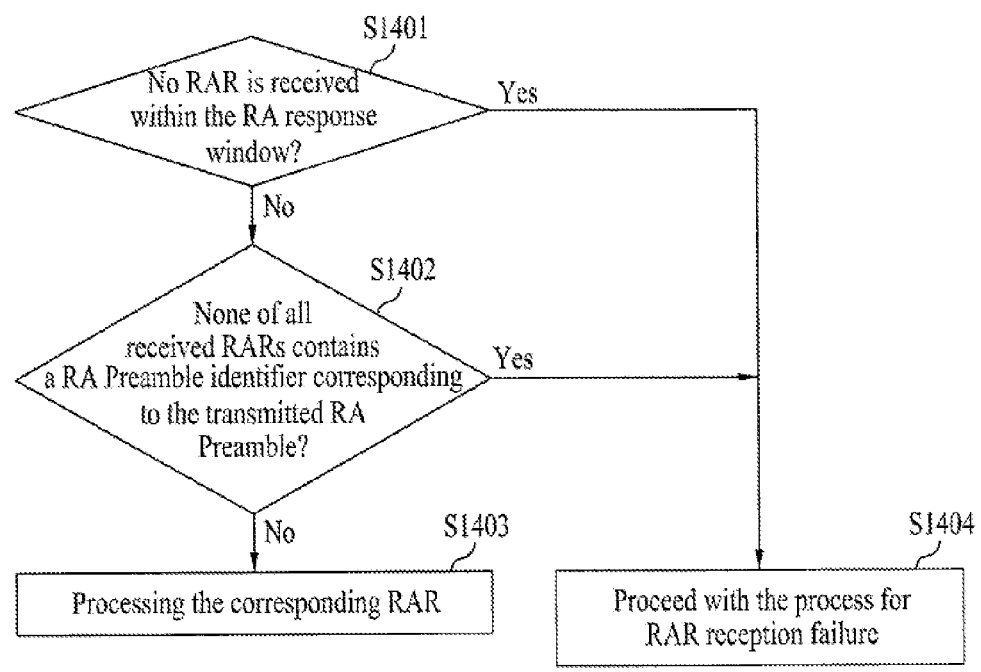
FIG. 13 illustrates an algorithm for receiving and processing a-random access response message of a user equipment improved according to yet another embodiment of the present invention.

FIG. 13 illustrates an algorithm for receiving and processing a random access response message of a user equipment improved according to yet another embodiment of the present invention.

In comparison with FIG. 4, the conditions of step 1402 are improved in the algorithm for receiving and processing a random access response message of FIG. 13. More specifically, when the user equipment receives a random access response including only a backoff indicator MAC subheader, as shown in FIG. 10, in the random access response reception window, from the base station, this indicates that the random access response has been received in the corresponding window in step 1401. Therefore, the procedure moves on to step 1402.

In step 1402, the user equipment determines the existence (or presence) of a random access response including a random access preamble identifier respective to the random access preamble transmitted by the corresponding user equipment. As shown in the above-described example, in the user equipment that received the random access response including only a backoff indicator MAC subheader, the corresponding random access response does not correspond to (or match) the random access response including the random access preamble identifier respective to the random access preamble transmitted from the corresponding user equipment. Therefore, the procedure moves on to step 1404, thereby performing operations according to the failure to receive the random access response.

Among the above-described improvements 1 to 3, improvement 1 represents an algorithm directly connecting the case of receiving a random access response including only a backoff indicator MAC subheader, as shown in FIG. 10, to the operations according to the failure to receive the random access response. And, improvement 2 and improvement 3 respectively represent algorithms modifying (or changing) one specific condition of the conventional determination steps, shown in FIG. 4, in order to connect the case of receiving a random access response including only a backoff indicator MAC subheader, as shown in FIG. 10, to the operations according to the failure to receive the random access response.

Figure 14:
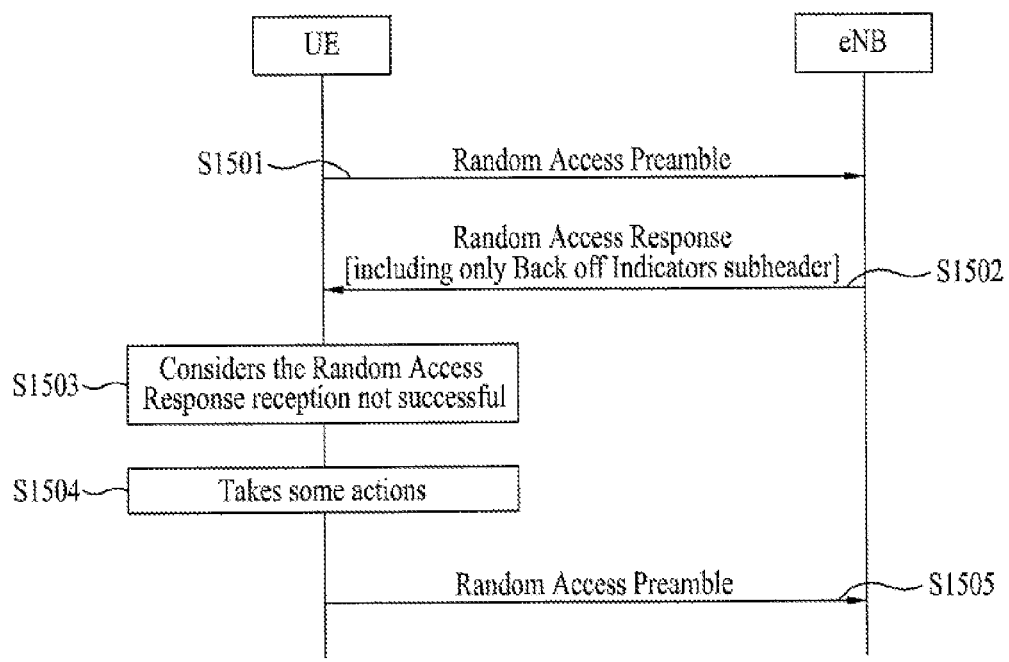
FIG. 14 illustrates a method of performing random access in a user equipment according to an embodiment of the present invention.

Meanwhile, exemplary operations of the user equipment according to the above-described embodiments of the present invention will now be described detail with reference to FIG. 14. FIG. 14 illustrates a method of performing random access in a user equipment according to an embodiment of the present invention.

First of all, in step 1501, the user equipment may transmit a random access preamble to the base station in a contention or non-contention based random access procedure. According to an embodiment of the present invention, the base station may transmit a MAC PDU format random access response message including only the backoff indicator MAC subheader, as shown in FIG. 10, to the user equipment (S1502). Also, according to a preferred embodiment of the present invention, the user equipment, which has received MAC PDU format random access response message including only the backoff indicator MAC subheader, is set (or adapted) to determine that the random access response reception has failed (S1503). For this, the above-described algorithm for receiving a random access response message of the user equipment with reference to FIG. 11 to FIG. 13 may be used. Such algorithm for receiving a random access response message of the user equipment may be set and used in a MAC layer module of a user equipment processor in the form of hardware or software.

Meanwhile, the user equipment, which has determined a random access response failure in step 1503, may perform the following operations according to the failure to receive the random access response message (S1504).
  A. Increment a PREAMBLE_TRANSMISSION_COUNTER value by 1.
  B. If the condition of PREAMBLE_TRANSMISSION_COUNTER=PREAMBLE_TRANS_MAX+1 is satisfied, the problem of random access is indicated (or reported) to the higher (or upper) layer.
  C. If the random access procedure currently under process corresponds to the contention based random access procedure, select a backoff parameter value according to a uniform distribution, so as to delay transmission by the selected backoff parameter value, thereby performing the random access source selection process.

After performing the above-described random access source selection process, the user equipment may transmit a random access preamble to the base station (S1505).

Figure 15:
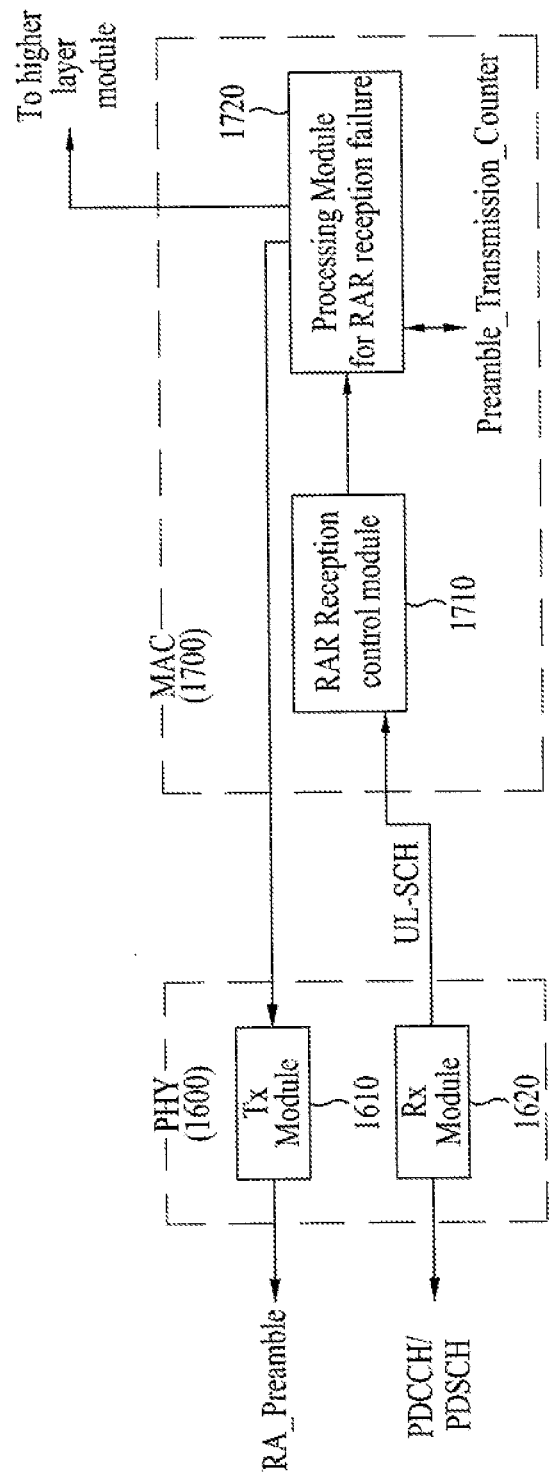
FIG. 15 illustrates a structure of a user equipment according to an embodiment of the present invention.

Hereinafter, the device structure of the above-described user equipment performing random access to the base station will be described in detail. FIG. 15 illustrates a structure of a user equipment according to an embodiment of the present invention.

Figure 1:
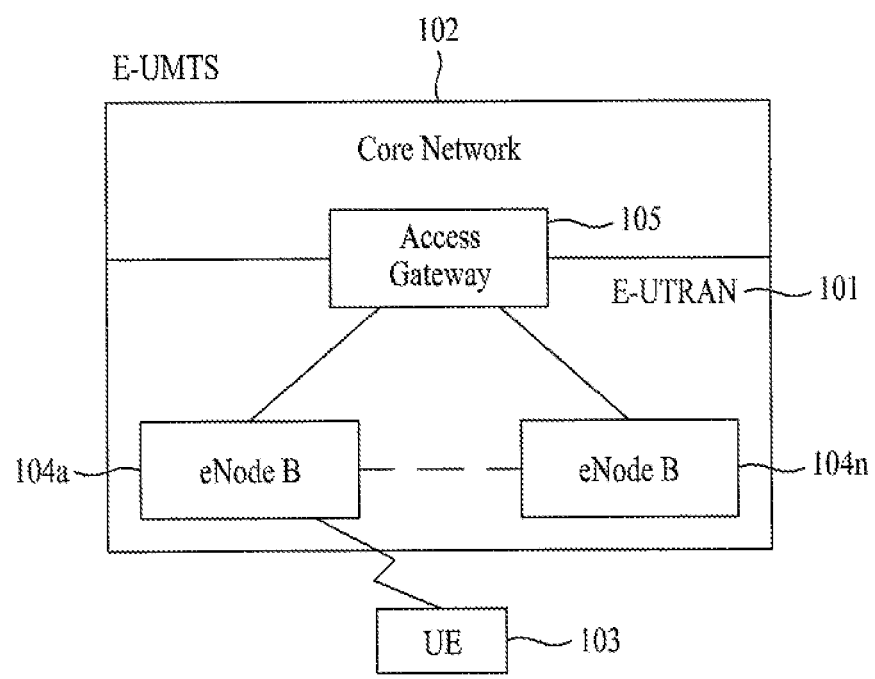
FIG. 1 illustrates a general view of an E-UMTS network structure as an example of a mobile telecommunications system.
Figure 2:
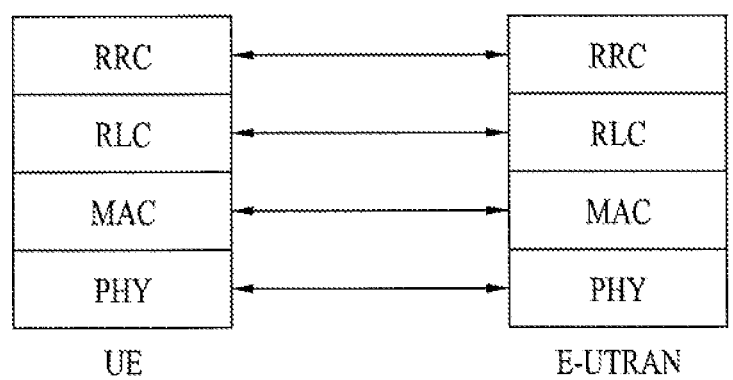
FIG. 2 and FIG. 3 respectively illustrate a structure of a radio interface protocol between a user equipment (or terminal), which is configured based upon a 3GPP radio access network standard, and a UTRAN.
Figure 3:
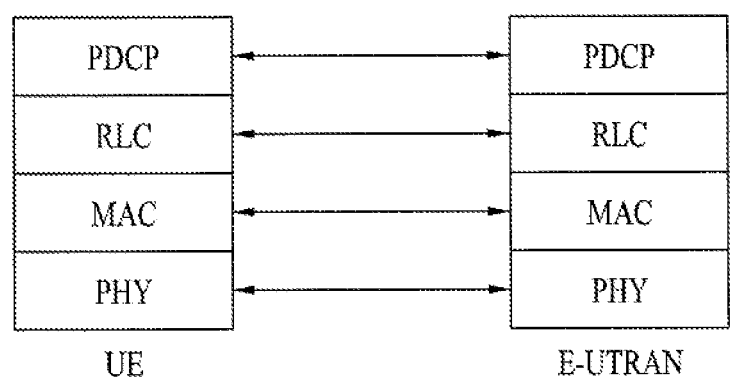

The user equipment according to the embodiment of the present invention and, more particularly, a processor of the user equipment may include a physical (PHY) layer module 1600, a medium access control (MAC) layer module 1700, and a higher layer module. Herein, the PHY layer module 1600 includes a transmitting module (Tx module) 1610 and a receiving module (Rx module) 1620. The MAC layer 1700 performs the actual processing operations of the random access procedure. And, the higher layer module corresponds to a layer higher than the above-described MAC layer, with reference to FIG. 2 and FIG. 3.

First of all, the user equipment according to the embodiment of the present invention may be configured so as to be capable of transmitting a random access preamble through the Tx module 1610 of the PHY layer module 1600. Additionally, the user equipment according to the embodiment of the present invention may be configured so as to be capable of receiving a medium access control protocol data unit (MAC PDU) format random access response message through the Rx module 1620 of the PHY layer module 1600 from the base station. Herein, the MAC PDU format random access response message corresponds to the response for the random access preamble transmitted by the user equipment. More specifically, it is proposed that the Rx module 1620 of the user equipment is configured so as to receive the MAC PDU format random access response message including zero, one, or multiple MAC RARs.

Meanwhile, the MAC layer module 1700 of the user equipment according to the embodiment of the present invention may include a random access response (RAR) reception control module 1710 and a processing module for RAR reception failure 1720. The RAR reception control module 1710 of the MAC layer module 1700 according to the embodiment of the present invention corresponds to a module for embodying (or realizing) the algorithm for receiving and processing random access response messages, as described in FIG. 11 to FIG. 13, in the form of hardware or software. More specifically, if the random access response message received by the Rx module 1610 corresponds to the MAC PDU including only the backoff indicator subheader in the MAC header, the reception of the random access response message is determined to have failed. Accordingly, the user terminal according to the present invention is set (or adapted) to induce the operations of the processing module for RAR reception failure 1720, so as to perform subsequent operations according to the RAR reception failure.

More specifically, the RAR reception control module 1710 is set, so as to determine the case where the Rx module 1620 fails to receive a random access response message within the random access response message reception window, which has a predetermined time length, or to determine the case where the Rx module 1620 fails to receive a random access response message including a random access preamble identifier respective to the random access preamble transmitted by the Tx module 1610, as a case where the RAR message reception has failed. Herein, if the Rx module 1620 has failed to receive the random access response message including the random access preamble identifier respective to the random access preamble transmitted by the Tx module 1610, two different cases are assumed. In a first assumed case, all RAR messages received by the Rx module 1620 within the RAR message reception window include a random access preamble identifier that does not correspond with (or match) the random access preamble identifier respective to the random access preamble transmitted from the Tx module 1610. And, in the second assumed case, the Rx module 1620 receives a MAC PDU format RAR message including only the backoff indicator subheader within the MAC header.

Accordingly, the processing module 1720 performing operations according to the random access reception failure of the MAC layer module 1700 increments the random access preamble transmission counter by '1'. And, in case, the random access preamble transmission counter has reached a maximum transmission counter value, it is reported to a higher layer module that a problem in random access exists. Thereafter, if the current random access procedure corresponds to the contention based random access procedure, the backoff indicator is used so as to select a backoff parameter value based upon a uniform distribution and to delay transmission by the selected backoff parameter value, thereby performing the random access source selection process. After performing the above-described random access source selection process, the user equipment may retransmit the random access preamble through the Tx module 1610.

The MAC PDU format RAR message received by the Rx module 1620 of the user equipment may be received through a physical downlink shared channel (PDSCH). And, the Rx module 1620 of the user equipment may monitor the PDCCH within the predetermined RAR reception window, so as to receive the MAC PDU format RAR message.

The random access scheme for a user equipment according to the present invention has the following advantages. By supporting MAC PDU format RAR messages, which include only a backoff indicator subheader in the MAC header according to the embodiments of the present invention, a concentration in random access from multiple user equipments, in case of a lack in system source, may be efficiently distributed. Furthermore, when algorithm for receiving and processing RAR messages according to the embodiments of the present invention is improved, even when supporting MAC PDU format RAR messages including only a backoff indicator subheader in the MAC header, as described above, the user equipment may perform subsequent operations without any error.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of a terminal in a communication system, the method comprising:
    transmitting a random access preamble via a physical random access channel (PRACH) to a network; and
    monitoring a random access response after transmitting the random access preamble during a specific time window,
    wherein, if no random access response containing a random access preamble identifier corresponding to the transmitted random access preamble is received within the specific time window and a specific random access response containing a backoff indicator subheader is received, the method further comprises:
    incrementing a preamble transmission counter by 1; and
    delaying a subsequent random access preamble transmission by a backoff time selected using a backoff indicator in the backoff indicator subheader, if the random access preamble was selected by a medium access control (MAC) layer.

2. The method of claim 1, further comprising:
    indicating to a layer higher than the MAC layer that there is a random access problem, if the preamble transmission counter reaches a predetermined maximum number.

3. The method of claim 1, wherein the specific time window comprises a random access response reception window.

4. A terminal for use in a communication system, the terminal comprising:
    a transmitter configured to transmit a random access preamble via a physical random access channel (PRACH) to a network; and
    a processor configured to monitor a random access response after transmitting the random access preamble during a specific time window,
    wherein, if no random access response containing a random access preamble identifier corresponding to the transmitted random access preamble is received within the specific time window and a specific random access response containing a backoff indicator subheader is received, the processor is further configured to:
    increment a preamble transmission counter by 1; and
    delay a subsequent random access preamble transmission by a backoff time selected using a backoff indicator in the backoff indicator subheader, if the random access preamble was selected by a medium access control (MAC) layer.

5. The terminal of claim 4, wherein the processor is further configured to indicate to a layer higher than the MAC layer that there is a random access problem, if the preamble transmission counter reaches a predetermined maximum number.

6. The terminal of claim 4, wherein the specific time window comprises a random access response reception window.

* * * * *